US008587816B2

(12) United States Patent
Gravely, Jr. et al.

(10) Patent No.: US 8,587,816 B2
(45) Date of Patent: Nov. 19, 2013

(54) METHOD AND APPARATUS FOR STORING INCREMENT VALUES WITHOUT USING AN INCREMENT COUNTER

(75) Inventors: John Willoughby Gravely, Jr., Clayton, NC (US); Richard J. Stievenart, Sanford, NC (US); Michael Larkin Shelby, Cary, NC (US)

(73) Assignee: Static Control Components, Inc., Sanford, NC (US)

( * ) Notice: Subject to any disclaimer, the term of this patent is extended or adjusted under 35 U.S.C. 154(b) by 271 days.

(21) Appl. No.: 13/012,393

(22) Filed: Jan. 24, 2011

(65) Prior Publication Data

US 2012/0188593 A1    Jul. 26, 2012

(51) Int. Cl.
    *G06K 15/00*      (2006.01)
    *G06K 1/00*      (2006.01)
    *G06F 15/00*      (2006.01)

(52) U.S. Cl.
    USPC ........................... 358/1.16; 358/1.15; 358/1.9

(58) Field of Classification Search
None
See application file for complete search history.

(56) References Cited

U.S. PATENT DOCUMENTS

| 5,797,061 | A | 8/1998 | Overall |
| 6,106,088 | A | 8/2000 | Wafler |
| 6,449,214 | B1 * | 9/2002 | Carr et al. ..................... 365/236 |
| 6,871,926 | B2 | 3/2005 | Adkins |
| 7,426,613 | B2 | 9/2008 | Booth |
| 7,844,786 | B2 | 11/2010 | Booth |
| 2002/0057319 | A1 * | 5/2002 | Saruta et al. .................... 347/86 |
| 2004/0156645 | A1 * | 8/2004 | Nakazato ........................ 399/27 |
| 2007/0136510 | A1 * | 6/2007 | Ippongi ......................... 711/103 |
| 2008/0187329 | A1 * | 8/2008 | Van Buren et al. ............. 399/24 |

* cited by examiner

*Primary Examiner* — Ming Hon

(57) ABSTRACT

Electronic systems, such as printing systems, often use components that have integral memory. The integral memory can be used to store information about the component. In some printing systems this memory includes a portion that stores a value indicative of an amount of a consumable that has been used. Some printing systems do this by using a counter to count the amount of the consumable used and then sending a count command to the memory. The increment count command is processed to increment the value stored within the memory. Disclosed is a method and system for allowing the memory to be updated by a count command without having to increment the value stored. This method allows print cartridges to be used in printing systems that utilize counters without having to increment the counter each time an increment command is received.

19 Claims, 4 Drawing Sheets

METHOD AND APPARATUS FOR STORING INCREMENT VALUES WITHOUT USING AN INCREMENT COUNTER

BACKGROUND

Many electronic devices have components that include an integrated memory. Often, the manufacturer of these devices wants to monitor usage to determine a remaining life of the device. One example of these devices is a printer having a memory on a printing cartridge.

Many printers, such as inkjet printers or electrostatic printers, print an image on a recording medium by dispensing a printing medium onto the recording medium. Ink jet printers operate by ejecting ink drops from a printhead onto the recording medium. The printhead may contain one or more supplies of ink or be connected to separate ink cartridges that supply ink. Color images are formed by ejecting color inks onto the recording medium from two or more printheads. One printhead is used to eject black ink and a second printhead is used to eject color ink. Alternatively, each color ink may be ejected by single printhead. Electrostatic or laser printers form an image on a recording medium by transferring toner particles onto the medium. Typically, a recording drum is charged and a latent image is formed on the drum by a laser. The latent image is developed on the drum by developer or toner particles and this image is transferred directly or indirectly onto a recording medium. In color printers multiple cartridges are provided to transfer color images.

One method of monitoring usage of a printing cartridge is to count the amount of printing that is performed. For example, in an inkjet printer, a counter may count the number of ink drops ejected from each printhead. In an electrostatic printer a counter may count the number of lines or pages printed by each cartridge. Each of the numbers counted is then processed as a count signal and the printer sends each of the count signals to the appropriate cartridge or printhead. The cartridge or printhead contains an integral memory that stores a value indicative the amount of printing agent used. When the cartridge or printhead receives the count signal the count signal is processed to increment the memory by the value indicated by the count signal. Implementation of this method allows for each cartridge or printhead to be updated with an amount of consumable material used.

When it is desired to determine an amount of consumable remaining in each cartridge or printhead, the printer or a host in communication with the printer sends a read signal to appropriate memory. This signal is processed and the value stored in the memory is read. This value can then be compared with a value indicative of a total amount of consumable that each cartridge or printhead is preloaded with. When the read value approaches the total value then a low toner or low ink condition is detected. This detection can result in a warning being provided to the user or in disabling the low cartridge.

An example of an image recording device using this method is described in U.S. Pat. No. 7,844,786. In this device, command protocols are supported in order to have one or more counters incremented. An increment counter command protocol permits the memory modules to receive an increment counter command. With an increment counter command, each memory module may include a counter that maintains its own count, which is increased by a specified value upon receipt of the increment counter command. The increment counter command may be utilized with a plurality of counters with different counts—for example global page counts, color page counts, letter-sized page counts, legal-sized paged counts, transparency page counts, etc. Thus, the global page count the color page count, the letter-sized page counts, and the transparency page counts in one or more memory modules may be incremented at the same time, which makes it unnecessary for the processing device to know of the present values of each of those counts that are being updated. Instead, each memory module is responsible for maintaining its own counts and updating the counts upon receipt of the increment counter command protocol.

The increment counter protocol includes a set of bits allocated for the increment counter command, the memory module address, the value that each counter will increment by, the length of the list of counters, and the address of each counter to increment within the memory module. According to one illustrative example, the increment counter command may be eight bits, the memory module address may be sixteen bits, the value that each counter will increment by may be eight bits, the length of the list of counters may be eight bits, and the address of each counter may be sixteen bits. Each memory module that is addressed will pull the signal on the status channel to a low voltage to signify that it is busy while it updates one or more counters by the value specified. The memory module will release the signal on the status channel to a high voltage to signify that it is ready after each addressed counter has been updated.

A problem with the method of updating consumable use described above is that memory locations on the individual cartridges is frequently rewritten. This frequent rewriting can result in slowing down a processing device located on the cartridge or used by the cartridge. Also, frequent rewriting of the memory may result in the memory failing or prematurely shorten the life of the memory. Therefore, this method may result in slowing the print speed of the printer or in shortening the useable lifetime of the memory and the cartridge that memory is loaded on.

SUMMARY

The present method and system allows a device having a memory to operate in a system that uses an increment to counter to operate without incrementing a memory in response to increment commands. This method and system overcomes the problems associated with frequently updating the value stored in a memory.

The method includes receiving, at one or more memory modules, a command signal transmitted from a processing device. Each memory device is provided with a location for storing a value indicative of the total amount of the consumable used. Each memory device also has multiple storage locations that can store a value therein. The command signal includes an increment counter command for instructing a memory module to increment a counter by a specific amount. When an increment count command signal is received, it is determined if each of the storage locations is storing a value. If at least one storage location is empty (i.e. not storing a value) then a value indicative of the count amount is stored in that location. If all of the storage locations are full (i.e. storing a value) then the values currently stored in each memory location are summed to create a total value. The total value is added to the value indicative of a total amount of consumable used and the value in each memory location is emptied (i.e. reset to no value). Then one of the memory locations is updated to store the value indicated by the increment counter command.

By implementing this method, a total value of the consumable used can be stored in a location. When it is desired to determine an amount of consumable remaining in the cartridge, the host sends a read signal to the respective cartridge.

This is signal is processed by and the value indicative of a total amount of consumable used is received by the host. The host compares this value to a predetermined value for the cartridge. When the two values are close the host can indicate to a user that cartridge is low on toner or ink. Alternatively, if the values are close or the same, the host may prevent the printer from using the cartridge.

In an alternative embodiment, the predetermined value is stored on the cartridge and the comparison is performed at the cartridge. In this scenario the comparison value is received by the host and used to determine if the cartridge is low on ink or toner.

In another embodiment, the "cartridge" is not a print cartridge but another element in the device that has a finite amount use. For example, printers use rollers to feed a recording medium through the print zone. The rollers may work by using friction to force the recording medium through the printer. The surface of the rollers is often a material like plastic or rubber that wears out through the life of the printer.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION OF THE DRAWINGS

In imaging and printing devices, page counts recorded by non-volatile memory modules ("memory modules") may be incremented as pages are printed. Page counts may include the total number of pages printed by a printer and the total number of pages printed for each of a number of print categories. Recording the number of pages for individual print categories permits the recording of page counts for specific types of printing tasks, such as the total number of color pages, monochrome pages, letter size pages, legal size pages, transparencies, etc., that may be printed. In addition to recording page counts, non-volatile memory modules may be packaged with reservoirs such as ink or toner cartridges, and the memory modules may contain one or more fields for recording the depletion of the reservoirs. It will be appreciated by one of ordinary skill in the art that imaging and printing devices may contain non-volatile memory modules that have one or more counts, resource bit fields, or a combination thereof.

Increment counters may be used in electronic devices that need to track an amount of use or lifecycle of a replaceable element. Also, the counter may be used to track other consumables in a printer, facsimile machine, photocopier, ar all-in-machine. For example, the memory element may be located on a sheet feeding device and the number of sheets fed from the sheet feeding device may be calculated to determine the remaining life of the sheet feeding mechanism.

For example, each counter may be stored in 12 byte areas. When an increment counter command is received, the counter in the memory module is incremented by the amount specified by the increment counter command. A success response is sent to the processor upon completion of the increment. When the processor sends a read command to the memory module, the correct stored amount is sent to the processor.

In the current invention, the increment counter command does not cause the memory module to increment the stored value. The counters are still stored in 12 contiguous bytes of the memory module. In three bytes of the memory module a base counter value stored. The other nine bytes are used as an increment counter storage area consisting of three areas of three contiguous bytes in each area. Each of the three storage areas is initialized to contain a logic value "0". The three areas are used to store the last three increment values for the counter command sent by the printer.

Figure 1:
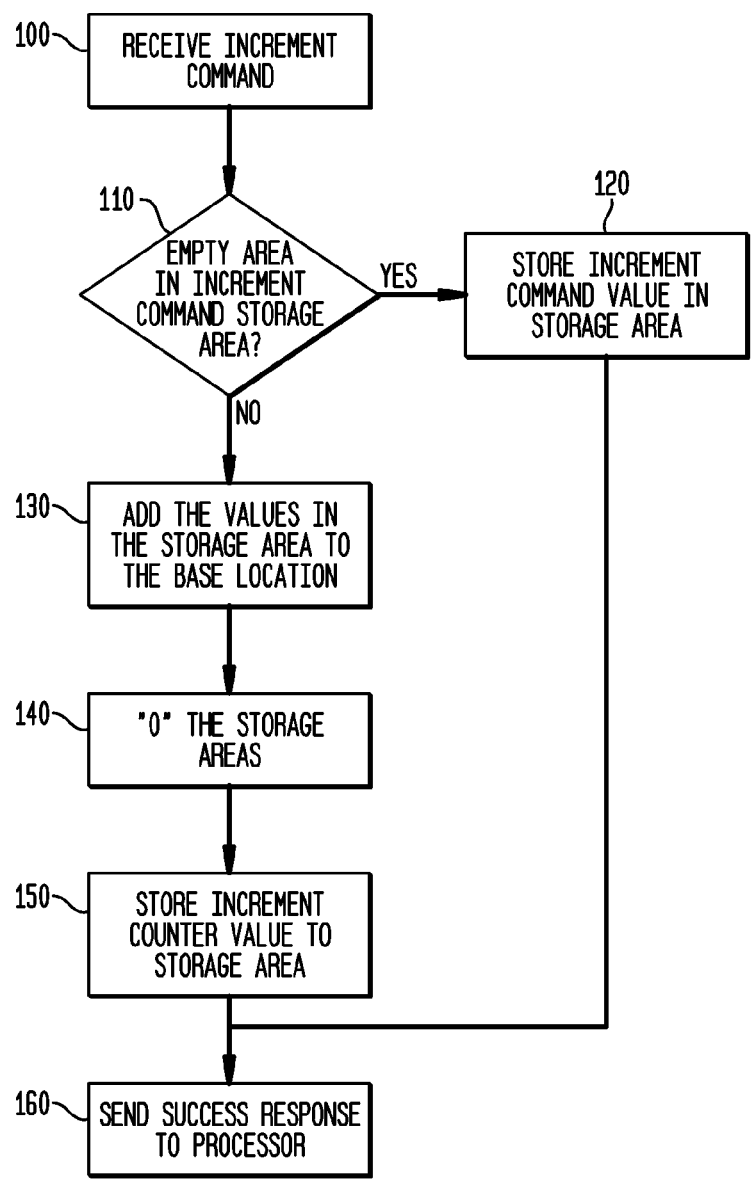
FIG. 1 illustrates a process for storing an increment command value in a memory module.

FIG. 1 illustrates the storage of an increment counter command value in a memory module. In operation, the memory module receives an increment counter command from a processer 100. The increment counter storage area is checked to see if there is an empty three byte location within the increment counter storage area 110. If there is an empty location the value indicated by the increment counter command is stored in the empty area 120. Then a success response is sent to the processor.

If there are not any empty three byte locations within the increment counter storage area a location must be emptied to store the value indicated by the increment counter command. This is done by adding all of the values currently stored in increment counter storage area to the current counter base value 130. This new value is the cumulative value for the increment counter and is stored in the base location of increment counter storage area 130. Next, the individual three byte areas of the increment counter storage area are set to a logic state "0" 140. This provides three empty locations in the increment counter storage area. The value indicated by the increment counter command is stored one of the empty three byte locations 150. Then a success response is sent to the processor 160.

Figure 2:
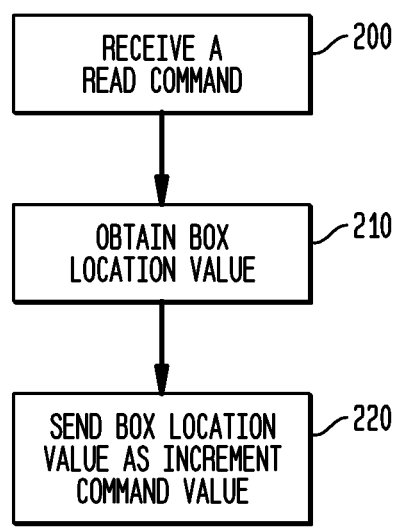
FIG. 2 illustrates an embodiment for processing a read command for the increment counter.

Next, the process for reading for the increment count value will be described. FIG. 2 illustrates one embodiment for processing a read command for the increment counter value. A read command is received from the processor 200. The memory module is checked to obtain the value stored in the base location 210. This value is used as the increment counter value and is sent to the processor as the increment counter value 220. An advantage of this embodiment is that the read command is processed quickly.

Figure 3:
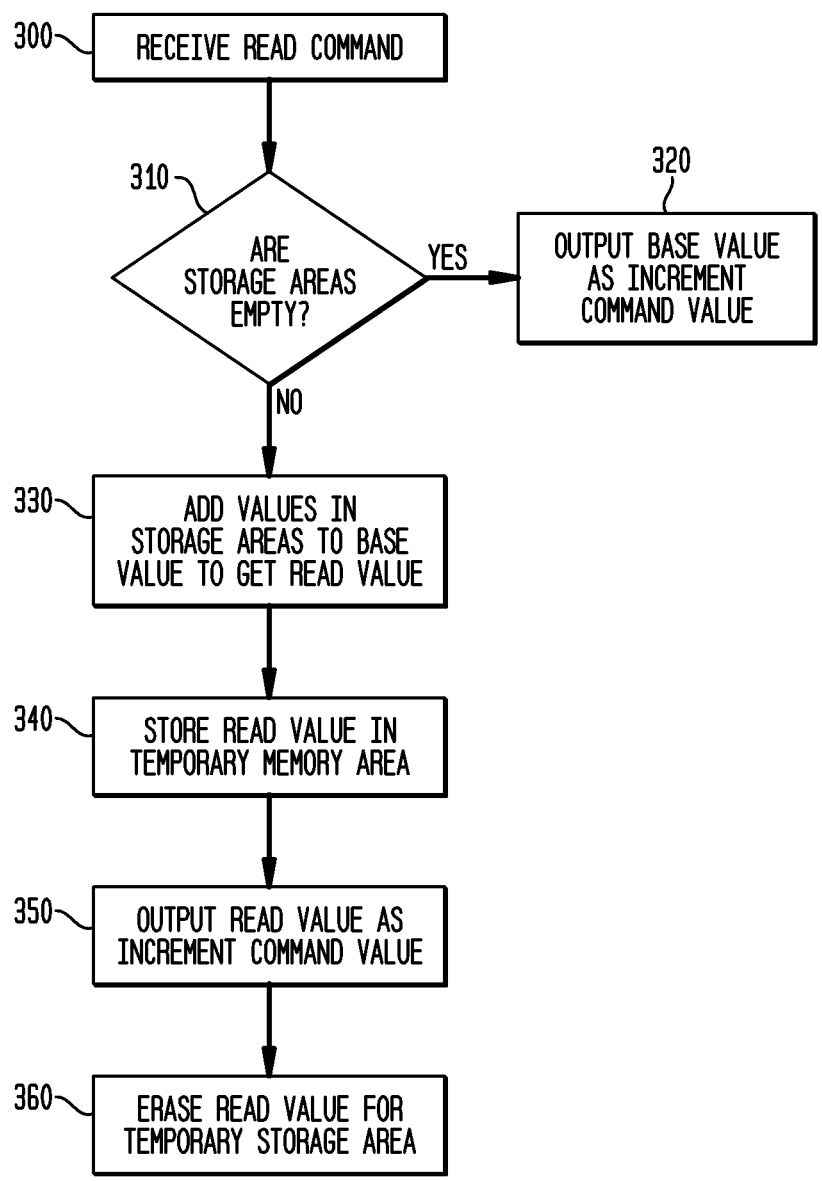
FIG. 3 illustrates an alternative embodiment for processing a read command for the increment counter.

FIG. 3 illustrates an alternative embodiment for processing a read command for the increment counter value. In this embodiment, a read command is received 300. The storage areas are checked to see if all of the storage areas are empty 310. If all of the storage areas are empty, the base value stored is sent as increment counter command value 320. If one or more of the storage areas contains a value, the values are added to the base value to calculate a read value 330. The read value is stored in a temporary storage area that is separate from the base value storage area 340. The read value is sent to the processor as the increment counter value 350. The read value is erased from the temporary storage area. The temporary storage of the value may be provided in an area of the storage device or in any other memory means such as a RAM. An advantage of this embodiment is that this allows for an accurate value to be given in response to a read command without requiring the base value to be changed in response to a read command.

Figure 4:
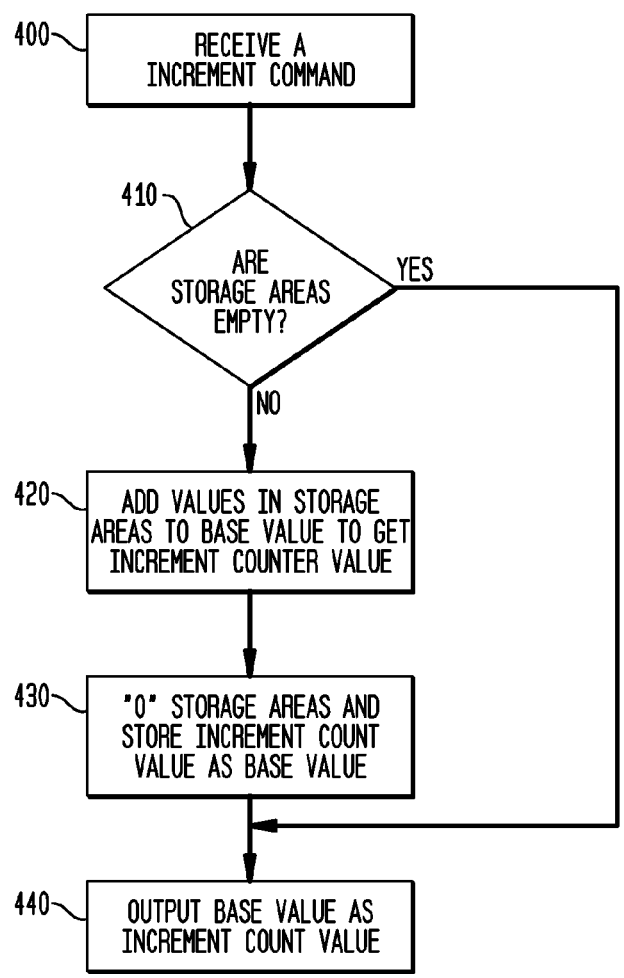
FIG. 4 illustrates another alternative embodiment for processing a read command for the increment counter.

FIG. 4 illustrates another alternative embodiment for processing a read command for the increment counter value. In this embodiment, a read command is received 400. The storage areas are checked to see if all of the storage areas are empty 410. If all of the storage areas are empty, the base value stored is sent as increment counter value 440. If one or more of the storage areas contains a value, the values are added to the base value to calculate an increment counter value 420. The storage areas are all set to logic "0" and the increment counter value is added to the base value and is stored as the new base value 430. The base value stored is sent to the processor as the increment counter value 440.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for storing increment values without using an increment counter comprising:
   receiving, at one or more memory modules, a command signal transmitted from a processing device, wherein the command signal includes an increment counter command for instructing a memory module to increment a counter by a specific amount; and
   processing the command at the one or more memory devices by;
   providing multiple storage locations;
   determining if each of the multiple storage locations contains a stored value;
   storing in one of the storage locations a value indicative of the specific amount when at least one of the multiple locations does not contain a stored value therein;
   determining that each of the multiple storage locations contains a stored value;
   summing each of the stored values to determine a total stored value;
   updating a total amount by the total stored value;
   emptying each of the storage locations so that each storage location does not contain a stored value; and
   storing in one of the storage locations a value indicative of the specific amount.

2. The method of claim 1 wherein there are four or more storage locations.

3. The method of 1 wherein the increment counter command is indicative of an amount of a consumable used by a printing device.

4. The method of claim 3, wherein the multiple storage locations are provided on a print cartridge.

5. The method of claim 1 further comprising:
   receiving a read command signal at the one more memory modules; and
   outputting an increment value.

6. A method of storing an amount of a consumable used in an imaging device comprising:
   receiving, at one or more memory modules, a command signal transmitted from a processing device, wherein the command signal includes an increment counter command for instructing a memory module to increment a counter by a specific amount; and
   processing the command at the one or more memory devices by;
   providing multiple storage locations;
   determining if each of the multiple storage locations contains a stored value;
   storing in one of the storage locations a value indicative of the specific amount when at least one of the multiple locations does not contain a stored value therein;
   determining that each of the multiple storage locations contains a stored value;
   summing each of the stored values to determine a total stored value;
   updating a total amount by the total stored value;
   emptying each of the storage locations so that each storage location does not contain a stored value; and
   storing in one of the storage locations a value indicative of the specific amount.

7. The method of claim 6 wherein there are four or more storage locations.

8. The method of 6 wherein the increment counter command is indicative of an amount of a consumable used by the imaging device.

9. The method of claim 6 wherein the multiple storage locations are located on a print cartridge or printhead.

10. The method of claim 6 further comprising:
    receiving a read command signal at the one more memory modules; and
    outputting an increment value.

11. A printing system comprising:
    at least one print cartridge having an integral memory, wherein the integral memory includes multiple storage locations;
    a communication path for providing command signals to the at least one print cartridge;
    a counter for counting an amount of a consumable used by the at least on print cartridge, wherein a host device transmits command signals to the at least one print cartridge, the command signals includes an increment counter command for instructing the integral memory to increment a counter by a specific amount, wherein the increment counter command is processed by checking to see if each of the multiple storage locations contains a stored value and storing in one of the storage locations a value indicative of the specific amount when at least one of the multiple locations does not contain a stored value therein, wherein when each of the multiple storage locations has a stored value therein the increment counter command is processed by:

summing each of the stored values to determine a total stored value updating a total amount by the total stored value;

emptying each of the storage locations so that each storage location does not contain a stored value; and storing in one of the storage locations a value indicative of the specific amount.

12. The printing system of claim 11 wherein when the host device transmits a command signal to the at least print cartridge requesting an amount of consumable used, the value indicative of the specific amount is read.

13. The printing system of claim 11 wherein there are four or more storage locations in the at least one integral memory.

14. The printing system of claim 11 wherein the printing system is a color printing system and there are two or more print cartridges.

15. The printing system of claim 14, wherein for each print cartridge the printing system the counter counts an amount of consumable used and each print cartridge receives an increment counter command indicative of the amount of consumable used.

16. The printing system of claim 11 wherein the printing system is an inkjet printing system and the increment counter command is indicative of an amount of ink used.

17. The printing system of claim 11 wherein the printing system is an electrostatic printer and the increment counter command is indicative of an amount of toner used.

18. The printing system of claim 11 wherein the host device is located within the printing system.

19. The printing system of claim 11 wherein the host device is a computer in communication with the printing system.

* * * * *